United States Patent [19]

Reske et al.

[11] Patent Number: 4,978,725

[45] Date of Patent: Dec. 18, 1990

[54] TOUGHENED POLYOXYMETHYLENE AND SHAPED ARTICLES PRODUCED THEREFROM

[75] Inventors: Eckart Reske, Hofheim am Taunus; Ernst Wolters, Königstein/Taunus, both of Fed. Rep. of Germany

[73] Assignee: Hoechst Aktiengesellschaft, Frankfurt am Main, Fed. Rep. of Germany

[21] Appl. No.: 780,325

[22] Filed: Sep. 26, 1985

Related U.S. Application Data

[63] Continuation of Ser. No. 576,114, Feb. 2, 1984, abandoned.

[30] Foreign Application Priority Data

Feb. 4, 1983 [DE] Fed. Rep. of Germany ....... 3303761

[51] Int. Cl.$^5$ .............................................. C08L 59/00
[52] U.S. Cl. ..................................... 525/399; 525/410
[58] Field of Search ................................ 525/399, 410

[56] References Cited

U.S. PATENT DOCUMENTS 3,850,873 11/1974 Wurmb .............................. 535/440

FOREIGN PATENT DOCUMENTS

| 842325 | 5/1970 | Canada . |
| 0038881 | 11/1981 | European Pat. Off. . |
| 2051028 | 4/1971 | Fed. Rep. of Germany . |
| 1017244 | 1/1966 | United Kingdom . |

OTHER PUBLICATIONS

*Plastic Materials*, J. A. Brydson, 1966 (page 48).

*Primary Examiner*—Ana L. Carrillo
*Attorney, Agent, or Firm*—Connolly & Hutz

[57] ABSTRACT

The invention relates to mixtures composed essentially of polyoxymethylene and of 5 to 60% by weight of a polyurethane, the polyurethane being built up exclusively from aliphatic components and having an elongation at break of 800–1,500% and a Shore hardness A not exceeding 81.

The shaped articles produced from the mixture according to the invention are distinguished, above all, by an improved notched impact strength and by matt surfaces.

11 Claims, No Drawings

TOUGHENED POLYOXYMETHYLENE AND SHAPED ARTICLES PRODUCED THEREFROM

CROSS REFERENCE TO RELATED APPLICATIONS

This application is a continuation of application Ser. No. 576,114, filed Feb. 2, 1984 now abandoned, by Eckart Reske, Ernst Wolters for "Toughened Polyoxymethylene and Shaped Articles Produced Therefrom".

Thermoplastic polyoxymethylene molding compositions, which contain essentially oxymethylene units, have been used as versatile materials for a long time. They are distinguished, in particular, by high strength and hardness and by good resistance to chemicals and can, therefore, be employed instead of metals in many cases. However, the polyoxymethylenes have a relatively low toughness, in particular a relatively low notched impact strength, which naturally restricts their capacity to be used for some purposes.

It is known that the toughness of hard and relatively brittle thermoplastics can be improved by incorporating crosslinked or non-crosslinked elastomers in a suitable manner. Polyurethanes are suggested as elastomers for modifying polyoxymethylenes in German Patent Specification 1,193,240 and also in German Offenlegungsschrift 2,051,028.

Polyurethanes which are prepared using, preferably, aromatic diisocyanates and which, insofar as this is described, have an elongation at break of approx. 500% (in this respect see the examples, in particular), are employed for this purpose in the said German Patent Specification 1,193,240. In German Offenlegungsschrift 2,051,028 which has been mentioned—and also in German Patent Specification 1,193,240—aliphatic diisocyanates are disclosed as components for the preparation of suitable polyurethanes. Here too, however, aromatic polyurethanes having an elongation at break of, preferably, 300-800% are preferred. The mixtures according to this German Offenlegungsschrift preferably contain 60-40% by weight of oxymethylene polymer and, accordingly, preferably 40-60% by weight of polyurethane, since, if greater or smaller quantities of the two components are used, the properties of the resulting mixture are stated, according to the teaching of this German Offenlegungsschrift, to approximate very closely to the physical and chemical properties of the major component (cf. page 6, last paragraph of this German Offenlegungsschrift).

Mixtures of polyoxymethylene, glass fibers and 0.5-10% by weight (based on the total mixture) of a high-molecular polyurethane are also known from German Auslegeschrift 2,209,985. According to the examples, it is possible to employ polyurethanes based on aromatic as well as aliphatic diisocyanates, the Shore hardnesses A of these polyurethanes being 85 and above.

The object of the present invention was to provide corresponding mixtures which do not have the disadvantages of the state of the art and which, in particular, make possible shaped articles having good impact strength properties and a matt surface.

It has now been found that this object can be achieved in a surprising manner by employing, as the modifying agent for polyoxymethylene, a polyurethane which is composed of purely aliphatic components and which has a Shore hardness A of not more than 81 and an elongation at break of 800–1500%.

The invention therefore relates to a mixture composed essentially of polyoxymethylene and 5 to 60% by weight, preferably 10 to 40% by weight and especially 10 to 30% by weight, based on the total mixture, of polyurethane, wherein the polyurethane is built up exclusively from aliphatic components and has an elongation at break of 800–1500%, preferably 1000–1500%, and a Shore hardness A of not more than 81, preferably 80–60.

The invention also relates to shaped articles produced from this mixture.

The base polymers employed in accordance with the invention are the known polyoxymethylenes, such as are described, for example, in German Offenlegungsschrift 2,947,490. They are essentially unbranched linear polymers containing, as a rule, at least 80%, preferably at least 90%, of oxymethylene units ($-CH_2O-$). The term polyoxymethylene embraces in this case both homopolymers of formaldehyde or its cyclic oligomers, such as trioxane or tetroxane, and also corresponding copolymers.

Homopolymers of formaldehyde or trioxane in this case are polymers in which the hydroxyl end groups have been stabilized chemically, in a known manner, for example by esterification or etherification, against degradation.

Copolymers are polymers formed from formaldehyde or its cyclic oligomers, in particular trioxane, and cyclic ethers, cyclic acetals and/or linear polyacetals.

Suitable comonomers are (a) cyclic ethers containing 3, 4 or 5, preferably 3, ring members, (b) cyclic acetals other than trioxane containing 5-11, preferably 5, 6, 7 or 8, ring members, and (c) linear polyacetals, in each case in amounts of 0.1-20, preferably 0.5-10, % by weight. Copolymers formed from 99-95% by weight of trioxane and 1-5% by weight of one of the abovementioned co-components are the most suitable.

Comonomers suitable for trioxane are, in particular, compounds of the formula

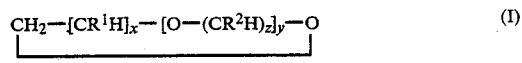

$$CH_2-[CR^1H]_x-[O-(CR^2H)_z]_y-O \qquad (I)$$

in which (A) $R^1$ and $R^2$ are identical or different and each denotes a hydrogen atom, an aliphatic alkyl radical having 1-6, preferably 1, 2, 3 or 4, carbon atoms or a phenyl radical and (a) x is 1, 2 or 3 and y is zero, or (b) x is zero, y is 1, 2 or 3 and z is 2, or (c) x is zero, y is 1 and z is 3, 4, 5 or 6, or (B) $R^1$ denotes an alkoxymethyl radical having 2-6, preferably 2, 3 or 4, carbon atoms or a phenoxymethyl radical, x being 1 and y being zero.

Suitable cyclic ethers are, above all, epoxides, for example ethylene oxide, propylene oxide, cyclohexene oxide, styrene oxide and epichlorohydrin, and also phenyl glycidyl ethers.

Suitable cyclic acetals are, above all, cyclic formals of aliphatic or cycloaliphatic α,ω-diols which contain 2-8, preferably 2, 3 or 4, carbon atoms and in which the carbon chain can be interrupted at intervals of 2 carbon atoms by an oxygen atom, for example glycol formal (1,3-dioxolane), propanediol formal (1,3-dioxane), butanediol formal (1,3-dioxepane) and diglycol formal (1,2,6-trioxocane) and also 4-chloromethyl-1,3-dioxolane and hexanediol formal (1,3-dioxonane). Unsaturated formals, such as butenediol formal (1,3-dioxacyclohept-5-ene), are also suitable.

Linear polyacetals which can be employed are both homopolymers or copolymers of the cyclic acetals defined above and linear condensation products formed from aliphatic or cycloaliphatic α,ω-diols and aliphatic aldehydes, preferably formaldehyde. Homopolymers of cyclic formals of aliphatic α,ω-diols having 2–8, preferably 2, 3 or 4, carbon atoms are used in particular, for example poly-(1,3-dioxolane), poly-(1,3-dioxane) and poly-(1,3-dioxepane).

Compounds having several polymerizable groups in the molecule, for example alkyl glycidyl formals, polyglycol diglycidyl ethers, alkanediol diglycidyl ethers or bis-(alkanetriol) triformals, are also optionally used, in an amount of 0.05–5, preferably 0.1–2, % by weight, relative to the total quantity of monomer, as additional comonomers for trioxane.

Under alkyl glycidyl formals mention should be made of compounds of the formula

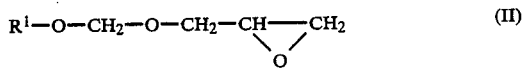

in which $R^1$ denotes an aliphatic alkyl radical having 1–10, preferably 1–5, carbon atoms. Alkyl glycidyl formals of the above formula containing linear, saturated aliphatic alkyl radicals, for example methyl glycidyl formal, ethyl glycidyl formal, propyl glycidyl formal and butyl glycidyl formal, are particularly suitable.

Polyglycol diglycidyl ethers denote compounds of the formula (III)

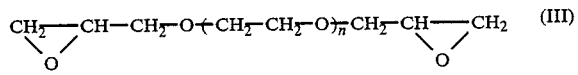

in which n denotes an integer from 2 to 5. Polyglycol diglycidyl ethers of the above formula in which n represents 2 or 3, for example diethylene glycol diglycidyl ether and triethylene gylcol diglycidyl ether, are particularly suitable.

Alkanediol diglycidyl ethers are compounds of the formula (IV)

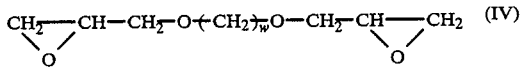

in which w denotes an integer from 2 to 6, preferably 2, 3 or 4. Butanediol diglycidyl ether is particularly suitable.

Bis-(alkanetriol) triformals are understood to mean compounds having one linear and two cyclic formal groups, in particular compounds of the formula (V)

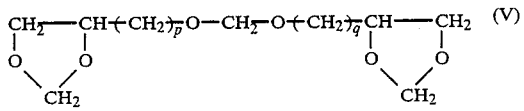

in which p and q each denote an integer from 3 to 9, preferably 3 or 4. Symmetrical bis-(alkanetriol) triformals of the abovementioned formula in which p and q denote the same number, for example bis-(1,2,5-pentanetriol) triformal and preferably bis-(1,2,6-hexanetriol) triformal, are particularly suitable.

The values of the reduced specific viscosity (RSV values) of the polyoxymethylene are generally 0.3–2.0 dl·g$^{-1}$, preferably 0.5–1.5 dl·g$^{-1}$. (determined in butyrolactone, stabilized with 2% by weight of diphenylamine, at 140° C. in a concentration of 0.5 g/100 ml), and the melt flow index values MFI 190/2 are in most cases between 0.02 and 10 g·minute$^{-1}$. The crystallite melting point of the polyoxymethylene is within the range from 140° to 180° C., preferably 150° to 170° C.; its density is 1.38–1.45 g·ml$^{-1}$, preferably 1.40–1.43 g·ml$^{-1}$ (determined as specified in DIN 53,479).

The trioxane copolymers which are used in accordance with the invention, preferably binary or ternary copolymers, are prepared in a known manner by polymerizing the monomers in the presence of cationic catalysts at temperatures between 0° and 100° C., preferably 50° and 90° C. (cf., for example, U.S. Pat. No. 3,027,352). Examples of catalysts used in this process are Lewis acids, for example boron trifluoride and antimony pentafluoride, and complex compounds of Lewis acids, preferably etherates, for example boron trifluoride diethyl etherate and boron trifluoride di-tert.-butyl etherate. Proton acids, for example perchloric acid, and salt-like compounds, for example triphenylmethyl hexafluorophosphate, triethyloxonium tetrafluoborate or acetyl perchlorate, are also suitable. The polymerization can be carried out in the mass, in suspension or in solution. The copolymers can, however, also be prepared in a known manner by the application of suitable heat treatment, in the presence of catalysts described above, to mixtures of formaldehyde homopolymers and the said comonomers and/or copolymers of formaldehyde and the said comonomers.

In order to remove unstable constituents, the copolymers are advantageously subjected to a thermal or hydrolytic, controlled partial degradation extending to primary alcohol groups (cf. U.S. Pat. Nos. 3,103,499 and 3,219,623).

The homopolymers of formaldehyde or trioxane which are used in accordance with the invention are also prepared in a known manner by catalytic polymerization of the monomer (cf, for example, U.S. Pat. Nos. 2,768,994 and 2,989,505) and are stabilized by esterification or etherification against degradation of the end of the chain.

The polyurethanes which are, in accordance with the invention, to be mixed into the polyoxymethylene and which preferably have a thermoplastic character, are prepared in a known manner by polyaddition from aliphatic polyisocyanates, in particular aliphatic diisocyanates, and aliphatic polyhydroxy compounds, such as polyesters, polyethers, polyester-amides or polyacetals or mixtures thereof, if appropriate in the presence of chain lengtheners.

Suitable aliphatic polyisocyanates are, in particular, aliphatic diisocyanates of the general formula

in which R is a saturated, linear or branched aliphatic radical having 1 to 20, preferably 2 to 12, carbon atoms or a substituted or unsubstituted, saturated, cycloaliphatic divalent radical having 4 to 20, preferably 6 to 45, carbon atoms.

In the above formula (VI), R can also represent a combination of divalent, open-chain, aliphatic and cycloaliphatic radicals and can, for example, denote

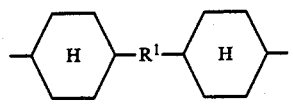

in which R¹ denotes a saturated, linear or branched, aliphatic radical having 1 to 8, preferably 1 to 3, carbon atoms. The two rings here preferably represent unsubstituted cyclohexane, R¹ preferably denotes the methylene, ethylene, methylmethylene or dimethylmethylene group.

If R represents an open-chain, divalent radical, it preferably represents a linear alkylidene radical —$(CH_2)_n$— in which n=2 to 12. Examples of this are the ethylidene, propylidene, pentamethylene and hexamethylene radicals and also the 2-methylpentamethylene radical, the 2,2,4-trimethylhexamethylene radical or the 2,4,4-trimethylhexamethylene radical. Diisocyanates of this type which are particularly preferred are hexamethylene diisocyanate and also 2,2,4-trimethylhexamethylene diisocyanate and 2,4,4-trimethylhexamethylene diisocyanate.

If R in the above formula (VI) denotes a cycloaliphatic radical, this is preferably the unsubstituted or substituted cyclohexane radical. Examples of diisocyanates of this type are 1,2-di-(isocyanatomethyl) cyclohexane or 1,4-di-(isocyanatomethyl)-cyclohexane or isophorone diisocyanate.

The diisocyanates of the formula (VI) can also be used in an oligomeric form, for example in a dimeric or trimeric form. Instead of the polyisocyanates, it is also possible to use polyisocyanates which have been masked in a known manner and which are obtained from the isocyanates mentioned, for example by an addition reaction with phenol or caprolactam.

Suitable aliphatic polyhydroxy compounds are polyethers, such as polyethylene glycol ethers, polypropylene glycol ethers and polybutylene glycol ethers, poly-1,4-butanediol ethers or mixed polyethers formed from ethylene oxide and propylene oxide. It is also possible to employ polyester-amides, polyacetals and, preferably, aliphatic polyesters for this purpose, all these compounds having free OH end groups.

The aliphatic polyesters which are preferentially used are essentially non-crosslinked polyesters having molecular weights of 500–10,000, preferably 500–5,000. As far as the acid component is concerned, they are derived from linear and/or branched aliphatic dicarboxylic acids, such as, for example, dicarboxylic acids of the general formula

HOOC—$(CH_2)_n$—COOH  (VIII)

in which n=0 to 20, preferably 4 to 10, especially adipic acid and sebacic acid. It is also possible to employ for this purpose cycloaliphatic dicarboxylic acids, such as cyclohexanedicarboxylic acids, and also mixtures with the above aliphatic dicarboxylic acids.

Suitable alcohol components for these polyesters are, above all, linear or branched aliphatic primary diols, such as, for example, diols of the general formula

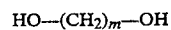

HO—$(CH_2)_m$—OH  (IX)

in which m=2 to 12, preferably 2 to 6. Compounds which may be mentioned here particularly are ethylene glycol, 1,4-butanediol, 1,6-hexanediol and 2,2-dimethyl-1,3-propanediol and also diethylene glycol. Cycloaliphatic diols, such as bis-hydroxymethylcyclohexanes, or mixtures with the aliphatic diols, are also suitable for this purpose.

The polyesters can be prepared from one particular dicarboxylic acid and one particular diol, but can also be prepared, as mentioned, from mixtures of several dicarboxylic acids and/or several diols.

Possible chain lengtheners for the preparation of the polyurethanes are, above all, low-molecular polyols, in particular diols, and also polyamines, especially diamines, or water.

The polyurethanes which are employed in accordance with the invention are preferably thermoplastic and thus preferably essentially non-crosslinked, i.e. they can be melted repeatedly without appreciable manifestations of decomposition. Their reduced specific viscosities, determined at 30° C. in dimethylformamide, are as a rule 0.5–3 dl/g, preferably 1–2 dl/g. The values of elongation at break are appropriately 800–1,500%, preferably 1,000–1,500%, while the Shore hardness A is not higher than 81 and is preferably between 80 and 60, and the glass transition temperature is in most cases not higher than −10° C., preferably not higher than −20° C.

The amount of this polyurethane in the mixtures according to the invention is 5 to 60% by weight, preferably 10 to 40% by weight and especially 10 to 30% by weight, based on the total mixture.

The mixture according to the invention can, if desired, also contain the known additives, such as stabilizers, nucleating agents, antistatic agents, light stabilizers, fireproofing agents, slip agents, lubricating agents, plasticizers, pigments, dyestuffs, optical brighteners, mold release auxiliaries and the like.

Suitable stabilizers against the effects of heat are, in particular, polyamides, amides of polybasic carboxylic acids, amidines, for example dicyandiamide, hydrazines, ureas, poly-(N-vinyllactams) and alkaline earth metal salts of aliphatic, monobasic to tribasic carboxylic acids, preferably containing hydroxyl groups, having 2–20 carbon atoms, for example calcium stearate, calcium ricinoleate, calcium lactate and calcium citrate. The stabilizers against oxidation employed are, above all, bis-phenol compounds, preferably diesters of monobasic 4-hydroxyphenylalkanoic acids having 7–13, preferably 7, 8 or 9, carbon atoms, with diols containing 2–6 carbon atoms. Examples of suitable light stabilizers are α-hydroxybenzophenone derivatives and benzotriazole derivatives. The stabilizers are in most cases employed in an amount totalling 0.1–5, preferably 0.5–3, % by weight (based on the total molding composition).

The mixture according to the invention can also contain the customary fillers, such as, for example, glass fibers, glass powders, graphite, carbon black, metal powders, metal oxides, silicates, carbonates and molybdenum(IV) sulfide. The amount of filler in this case is up to 70% by weight, preferably 5 to 40, % by weight, based on the total mixture. Preferably, however, the mixture according to the invention contains no fillers.

The preparation of the mixture according to the invention is effected in a simple manner by mixing the constituents at an elevated temperature at which the polymer components melt, but do not yet decompose, i.e. in general 160° to 250° C., preferably 180° to 240° C., in units having a good mixing action, such as, for example, Brabender mixers or extruders, preferably twin-screw extruders, or on mixing rolls. The components can, of course, also be mixed mechanically at room temperature initially and then subsequently be melted in order to achieve complete homogenization. It has been found in this respect that a mixture in which the constituents are distributed as homogeneously as would be desirable is not obtained merely be mechanical mixing without melting.

The mixture according to the invention can be comminuted mechanically, for example by chopping or grinding, to give granules, chips, flakes or powders. It is thermoplastic and therefore accessible to any modes of processing typical for thermoplastic compositions. It can, therefore, be processed by injection molding, extrusion, melt spinning or deep drawing to give shaped articles of any desired kind, and is suitable as an industrial material for the production of semi-finished and finished parts, such as shaped articles, for example tapes, rods, sheets, films, pipes and tubes, and also machine parts, for example casings, gear wheels, bearing components and control elements, and also automobile accessories, such as spoilers and the like.

Surprisingly, the toughness of the mixture according to the invention, compared with that of the pure polyoxymethylene, is already greatly increased at very much lower polyurethane contents than those corresponding, for example, to the teaching of German Offenlegungsschrift 2,051,028. That is to say, whereas according to the latter a polyurethane content of 40 to 60% by weight is considered to be necessary, the mixtures according to the invention exhibit greatly increased toughness values, above all increased notched impact strengths, at polyurethane contents as low as 5% by weight upwards, in particular at 10 to 30% by weight. On the other hand, at a relatively low polyurethane content, polyurethanes having Shore hardness values of 85 and above and having elongations at break of less than 800% increase the notched impact strength of mixtures with polyoxymethylenes only very slightly or not at all. In additio to their improved notched impact strength, the shaped articles produced from the mixture according to the invention are also distinguished by a low surface gloss. The paintability is also quite good if the polyurethane content is fairly high.

The following examples describe the present invention. The parameters used in these examples were determined as follows:

RSV VALUE (a) Polyoxymethylene: Determined in butyrolactone, stabilized with 2% by weight of diphenylamine, at 140° C. in a concentration of 0.5 g/100 ml.

(b) Polyurethane: Determined in dimethylformamide at 30° C. in a concentration of 0.5 g/100 ml.

Energy at break (50%): Determined on sheets 2 mm thick as specified in DIN 53,443.

Shore hardness A: As specified in DIN 53,505.

Notched impact strength: Determined on a standard small bar as specified in DIN 53,453.

EXAMPLES

Varying weighed amounts of polyoxymethylene and polyurethane, both optionally in the form of powder or granules having a particular size of approx. 3 mm, were melted and homogenized at temperatures between 190° and 230° C. in a type ZDSK Werner & Pfleiderer twin-screw extruder. The ribbon of melt emerging was cooled, granulated and dried. The products were converted in a customary manner by injection molding into shaped articles, of which the values obtainable from the following table were determined.

The following materials were employed as the polyurethane or polyoxymethylene:

Polyurethane A: an aromatic polyester-polyurethane, elongation at break 400–450%, Shore hardness A 85, density 1.20 g·cm$^{-3}$.

Polyurethane B: an aromatic polyester-polyurethane, elongation at break 550–500%, Shore hardness A 80, density 1.19 g·cm$^{-3}$.

Polyurethane C: an aliphatic polyester-polyurethane containing hexamethylene diisocyanate, adipic acid, ethylene glycol, 1,4-butanediol, neopentylglycol and 1,6-hexanediol as the main constituents, elongation at break 1070%, Shore hardness A 72, RSV value 1.5 dl/g, density 1.14 g·cm$^{-3}$.

Polyurethane D: an aromatic polyether-polyurethane, elongation at break 450%, Shore hardness A 80, density 1.13 g·cm$^{-3}$.

Polyurethane E: an aromatic polyether-polyurethane, elongation at break 350%, Shore hardness A$\geq$90, Shore hardness D 55, density 1.15 g·cm$^{-3}$.

Polyurethane F: an aromatic polyester-polyurethane, elongation at break 600%, Shore hardness, A 80, density 1.18 g·cm$^{-3}$.

Polyoxymethylene: a copolymer formed from trioxane and approx. 2% by weight of ethylene oxide, melt flow index MFI 190/2 approx. 0.9 g·minute$^{-1}$, density 1.141 g·cm$^{-3}$. Stabilizer: 0.1% by weight of dicyandiamide and 0.4% by weight of a phenolic antioxidant.

TABLE

| | Polyurethane | | | |
|---|---|---|---|---|
| Type | Content (% by wt.) | Notched impact strength (kJm$^{-2}$) | Energy at break (50%) (joules) | Surface quality** |
| ./* | 0 | 6.0 | 1.2 | glossy |
| A* | 10 | 5.7 | | " |
| A* | 20 | 7.5 | | " |
| B* | 15 | 8.9 | | " |
| B* | 25 | 9.4 | | " |
| D* | 20 | 6.0 | | " |
| E* | 20 | 3.8 | | " |
| F* | 20 | 8.0 | | " |
| F* | 30 | 10.1 | | " |
| F* | 40 | 14.2 | | " |
| F* | 50 | 19.6 | | " |
| C | 5 | 6.0 | 4.5 | slightly glossy |
| C | 10 | 9.2 | 13.0 | matt |
| C | 15 | 12.0 | 20.0 | " |
| C | 20 | 17.0 | 24.0 | " |
| C | 30 | 23.0 | 35.0 | " |
| C | 40 | 33.0 | >36 | " |
| C | 50 | no fracture | >36 | " |

*as a comparison
**determined visually

We claim:

1. A high impact strength composition consisting essentially of a polyoxymethylene and of 5 to 60% by weight, based on the total mixture, of a polyurethane resin which comprises the product of polyaddition from aliphatic polyhydroxy compounds and aliphatic diisocyanates of the general formula

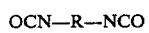

OCN—R—NCO in which R is a saturated, linear or branched aliphatic radical having 1 to 20 carbon atoms or a substituted or unsubstituted, saturated, cycloaliphatic divalent radical having 4 to 20 carbon atoms, the polyurethane resin having an elongation at break of 800–1,500% and a Shore hardness A not exceeding 81.

2. A composition mixture as claimed in claim 1, wherein the polyurethane has a Shore hardness A of 80 to 60.

3. A composition mixture as claimed in claim 1 or wherein the amount of polyurethane is 10 to 40% by weight.

4. A composition mixture as claimed in claim 1, wherein the polyurethane is thermoplastic.

5. A composition mixture as claimed in claim 1, wherein the polyurethane carries methyl substituents on the main chain.

6. A composition mixture as claimed in claim 1, wherein the polyurethane is essentially built up from hexamethylene diisocyanate, adipic acid, ethylene glycol, 1,4-butanediol, neopentylglycol and 1,6-hexanediol.

7. A composition as claimed in claim 1 wherein R denotes a substituted or unsubstituted cyclohexane radical.

8. A composition as claimed in claim 1 wherein R denotes the linear alkylidene radical of the following structural formula $$-(CH_2)_n-$$

in which $n = 2$ to 12.

9. A composition as claimed in claim 1, wherein the aliphatic polyhydroxy compound is a compound having a free OH end group selected from the group consisting of polyethers, polyesteramides, and polyacetals.

10. A shaped article produced from the mixture as claimed in claim 1.

11. A high impact strength composition consisting essentially of a polyoxymethylene and of 5 to 60% by weight, based on the total mixture, of a polyurethane resin which comprises the product of polyaddition from aliphatic polyhydroxy compounds and aliphatic diisocyanates of the general formula $$OCN-R-NCO$$

in which R is a saturated, linear or branched aliphatic radical having 1 to 20 carbon atoms or a substituted or unsubstituted, saturated, cycloaliphatic divalent radical having 4 to 20 carbon atoms and said polyurethane resin has an elongation at break of 1000–1500%.

* * * * *